United States Patent [19]

Ban et al.

[11] Patent Number: 4,534,400

[45] Date of Patent: Aug. 13, 1985

[54] METHOD FOR MAKING A REINFORCED ARTICLE FOR AN INTERNAL COMBUSTION ENGINE

[75] Inventors: Keisuke Ban, Fujimi; Akimasa Daimaru, Omiya, both of Japan

[73] Assignee: Honda Giken Kogyo Kabushiki Kaisha, Tokyo, Japan

[21] Appl. No.: 418,502

[22] Filed: Sep. 15, 1982

[30] Foreign Application Priority Data

Sep. 16, 1981 [JP] Japan ............... 56-145990

[51] Int. Cl.³ ........................... B22D 19/14
[52] U.S. Cl. ................................... 164/97; 164/108
[58] Field of Search ............ 164/97, 108–110; 428/608, 611, 373; 75/229, 230

[56] References Cited

U.S. PATENT DOCUMENTS

| | | | |
|---|---|---|---|
| 3,473,900 | 10/1969 | Sara | 428/608 |
| 3,864,807 | 2/1975 | Schneider et al. | 428/611 X |
| 3,992,160 | 11/1976 | Marzocchi et al. | 75/229 |
| 4,266,596 | 5/1981 | Ban et al. | 164/108 X |

FOREIGN PATENT DOCUMENTS

| | | | |
|---|---|---|---|
| 564750 | 1/1916 | Japan . | |
| 53-142904 | 12/1978 | Japan | 164/97 |
| 522248 | 10/1976 | U.S.S.R. | 428/608 |

OTHER PUBLICATIONS

Schaum's Outline of Theory and Problems of Strength of Materials by: William A. Nash, PhD., Copyright 1957.

*Primary Examiner*—Kuang Y. Lin
*Attorney, Agent, or Firm*—Armstrong, Nikaido, Marmelstein & Kubovcik

[57] ABSTRACT

Method of making a cast reinforced article, such as a connecting rod which includes preparing a bundle of uni-directional inorganic fibers, at least some of which are metallic or metal coated by placing the bundle into a shaping container and heating it to partially fuse the metallic or metal coated fibers to each other. The partially fused bundle is positioned in a mold with a fixed minimum gap surrounding it. A molten light metal alloy is squeeze cast into the mold forming a matrix of the alloy and the bundle. In the case of a connecting rod, the bundle should be shaped elliptically and positioned in the mold such that ($I(c)\ y < I(c)\ x$).

9 Claims, 6 Drawing Figures

METHOD FOR MAKING A REINFORCED ARTICLE FOR AN INTERNAL COMBUSTION ENGINE

BACKGROUND OF THE INVENTION

The present invention relates to the manufacturing of a squeeze cast, fiber bundle reinforced article, such as a connecting rod for an internal combustion engine.

Many component parts of internal combustion engines have heretofore been made of various types of steel. It has been a recent desire that these parts be replaced by ones of a light metal to reduce the overall weight of the engine. One example of such a replacement and the attendant problems encountered would be a piston connecting rod.

Connecting rods must have at least a certain compressive or buckling strength, particularly in the rod portion thereof, yet still fit within certain tightly restrained dimensions. Conventional steel alloy rods are relatively slim in the direction of rotation in order to not come into contact with the piston skirt. In attempting to make a connecting rod out of an aluminum alloy, sufficient buckling strength must be retained and the rod must be able to fit within the necessary locus of space defined by the piston, the crankshaft, and the crankcase.

It has been discovered by the present inventors that the necessary buckling strength can be imparted to the connecting rod made of a light metal alloy by providing a reinforcing bundle of uni-directional fibers in the core of the rod portion. The light metal alloy fills in the interstices in the bundle to form a metal-fiber matrix.

However, stay within the necessary locus of space, it has been discovered by the present inventors that it is necessary to reorient the position of the ribs of the rod portion of the connecting rod to a position at right angles to that of a conventional steel rod.

That is, the rod portion must be designed such that the second moment of area $I_x$ about an axis X which is perpendicular to the longitudinal axis of the rod and parallel to the direction of its rotation is larger than the second moment of area $I_y$ about an axis Y which is perpendicular to the X-axis and the longitudinal axis of the rod.

$$I_x > I_y$$

The present applicant has proposed previously two different types of connecting rods which are made of a light alloy having rod portion 1 reinforced by a bundle of uni-directional inorganic fibers F. The connecting rod includes a smaller annular shaped end portion and a semi-annular shaped larger end portion at the ends of the rod portion. The smaller annular portion can be considered to have a center axis perpendicular to the of direction rotation of the rod when in use. The rod portion can be considered to have a longitudinal axis. The Y-axis is defined as parallel to the central axis and perpendicular to the longitudinal axis. The X-axis is defined as perpendicular to both the center axis and the longitudinal axis. In these previous designs, the second moment of area about the Y-axis ($I(c) y$) is generally equal to or greater than the second moment of the core of area about the X-axis ($I(c) x$). In the embodiment shown in FIG. 5 $I(c) y$ is larger than $I(c) x$. As shown in FIG. 6, the second moment of area of the core about the X-axis is equal to the second moment of area of the core about the Y-axis.

When the second moment of area of the core about the Y-axis is greater than the second moment of area of the core about the X-axis, sufficient buckling strength is given to the rod portion of the connecting rod. In this manner, a fiber bundle reinforced light alloy connecting rod gives a comparable performance equal to that of a connecting rod being made entirely of steel or the like.

However, certain difficulties are encountered in casting such a connecting rod. That is, when the second moment of area of the core about the Y-axis is larger than the second moment of area of the core about the X-axis ($I(c) y > I(c) x$), the fiber bundle is generally shaped as an ellipse having its major axis along the X-axis. As noted above, $I_y$ of the rod must be kept less than $I_x$ of the rod. This requires that the bundle divide the rod-shaped portion into two sections forming the side ribs of the connecting rod. When a light molten metal alloy is cast into a mold to form the matrix with the fiber bundle, a chill surface is easily formed at the boundary between the uni-directional bundle of inorganic fibers and the cavity of the mold. Often, the bundle actually contacts the side wall of the cavity. As a result, a cold shut is apt to occur at the chill surface when the connecting rod is being cast thereby creating a defect in the rod. This "cold shut" type of defect occurs when there is an insufficient gap between the bundle and the side wall of the mold cavity to permit the molten metal to flow and close around the outer surface of the bundle. A ridge or valley is created at the edge where the metal ceases to flow.

In the case of the uni-directional bundle of inorganic fibers having a circular shape as shown in FIG. 6, wherein the second moment of area of the core about the Y-axis equals the second moment of area of the core about the X-axis, ($I(c) y = I(c) x$), the gap formed between the uni-directional bundle of inorganic fibers F and the cavity within the mold is very small. Thus, the molten metal may chill in this gap more easily which could cause a cold shut in filling the molten metal into the mold.

To form the uni-directional bundle of inorganic fibers, stainless steel fibers or other metallic fibers or non-metallic fibers such as silicon carbide, carbon, alumina, and the like could be used. It would be of great advantage to use non-metallic inorganic fibers having a lower specific gravity than metallic fibers in order to produce a composite connecting rod which is light in weight. However, certain problems occur in attempting to use solely non-metallic inorganic fibers in that it is difficult to keep the bundle tightly together in the casting process because it is difficult to have the fibers adhere to one another. Further, in order to produce a reinforced article or connecting rod having a light metal alloy formed into a matrix with a bundle of uni-directional fibers, it would be desirable to pre-heat the bundle of fibers prior to the casting steps and to have the bundle of fibers retain a certain amount of the heat so that no chilling of the molten metals being cast would occur upon contact with the bundle. The usual non-metallic inorganic fibers have a low thermal conductivity. Therefore, it takes a considerable length of time to heat the bundle properly so that it will retain sufficient heat to provide good filling performance by preventing chilling of the casting metal. Further, since most non-metallic inorganic fibers have very low co-efficients of thermal expansion compared with the metal to be formed into the matrix, a certain amount of residual stress in the matrix will be retained after the connecting rod has been produced because the fiber bundle does not contract as much as or as fast as the surrounding metal.

OBJECTS AND SUMMARY OF THE INVENTION

It is an object of the present invention to provide a method of making a cast, reinforced article, such as a connecting rod for an internal combustion engine which avoids the possibility of a cold shut defect in the article.

It is a further object of the present invention to provide a method for producing a light-weight connecting rod having a bundle of uni-directional fibers therein which keeps the advantage of low weight by utilizing non-metallic inorganic fibers yet is capable of being heated more quickly and being better to retain an appropriate, proper shape.

It is yet a further object of the present invention to provide a method for producing a cast article reinforced by a bundle of uni-directional inorganic fibers in which the residual stress after casting is reduced.

The above and other objects are attained in a method of making a connecting rod for an internal combustion engine in accordance with the present invention. The rod has a first semi-annular end portion, a second annular end portion, and a rod portion therebetween. The second annular portion has a center axis. The rod portion has a longitudinal axis, an X-axis perpendicular to the longitudinal axis and perpendicular to the center axis, and a Y-axis perpendicular to the longitudinal axis and parallel to the center axis.

The method comprises the steps of forming a bundle of inorganic reinforcing uni-directional fibers, positioning and shaping the bundle in a mold, and squeeze casting a molten light alloy into the mold forming a matrix of the alloy and the bundle. Squeeze casting is a known process and is not further described herein.

The mold has cavities to form the semi-annular portion, the annular portion, and the rod portion. The cavity for the rod portion is sized to ensure that Ix of the rod is greater than Iy. The bundle is positioned to bridge from the cavity for the semi-annular portion to the cavity for the annular portion and to retain a fixed minimum gap between the bundle and the side walls of cavity for the rod portion. The bundle is shaped such that a second moment of area of the core about the Y-axis (I(c) y) taken across a cross-section perpendicular to the longitudinal axis is less than the second moment of area of the core about the X-axis (I(c) x).

The step of forming the bundle can include forming a core bundle of a plurality of uni-directional inorganic non-metallic fibers, surrounding the core bundle with a plurality of uni-directional metallic fibers or non-metallic fibers having a metal coating, placing the surrounded core bundle in a heat-resistant shaping container, and heating the contained surrounded core bundle to at least partially fuse the uni-directional metallic fibers to each other and to the core bundle or at least partially fuse the non-metallic fibers having a metal coating to each other and to the core bundle.

The bundle can be shaped as an ellipse in cross-section having a major axis on the Y-axis and a minor axis on the X-axis.

DETAILED DESCRIPTION OF THE PRESENT INVENTION

Figure 1:
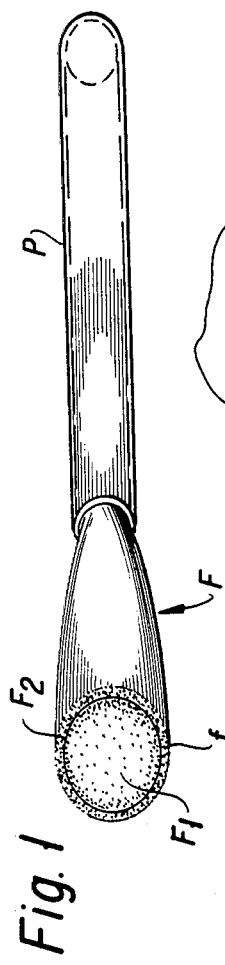
FIG. 1 is a perspective illustration showing the inserting of a uni-directional bundle of fibers into a heat-resistant pipe for pre-heating and preparing the bundle of fibers in accordance with the present invention.
Figure 2:
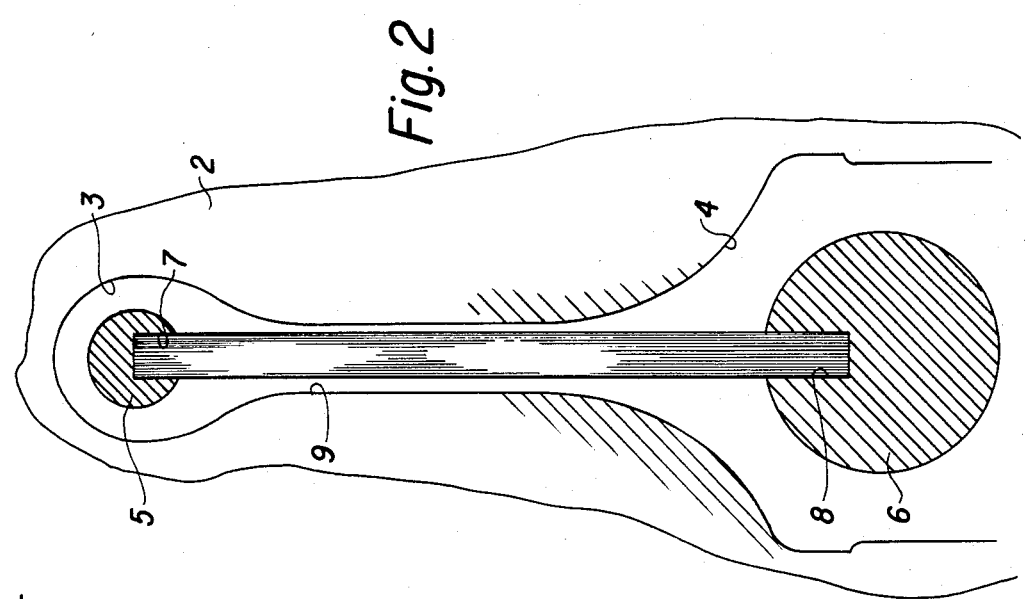
FIG. 2 is a plan view showing the relation between a metallic mold and a uni-directional bundle of inorganic fibers in accordance with the present invention.
Figure 3:
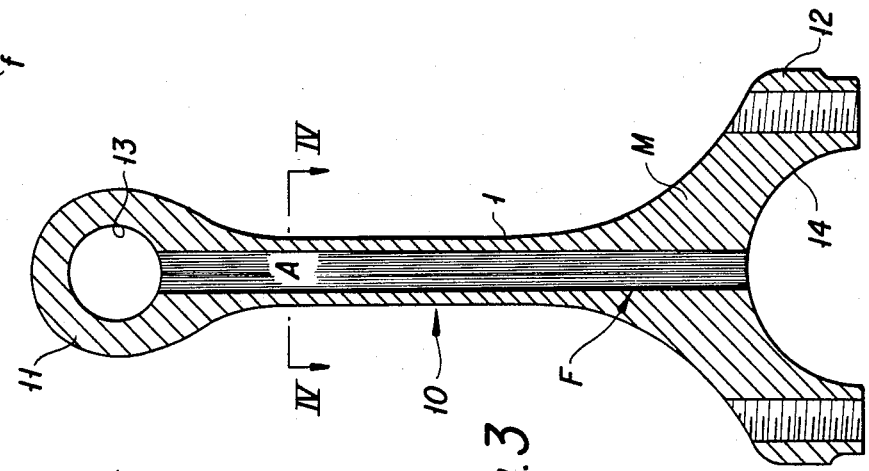
FIG. 3 is a longitudinal front sectional view of a connecting rod made in accordance with the present invention.

Example I:

A bundle of 70,000 stainless steel fibers F (SUS 32 in accordance with Japanese Industrial Standards (JIS)) each having an outside diameter of 25 microns was prepared and inserted into a heat resistant tube P. The tube could be made, for example, of silica glass. The shape of the cross section of the tube is an ellipse as shown in FIG. 1. The bundle of stainless steel fibers are heated at 700° C. for 10 minutes. In this manner, the stainless steel fibers are partially fused together. That is, at the points where the different fibers touch each other, they are fused or welded together. The temperature of about 700° C. is critical because if heated at a higher temperature, the fibers lose strength. The major axis diameter of the ellipse is 12 mm and the minor axis diameter is 9.2 mm. The bundle is 136 mm long. The bulk density is 3.1 grams/cc and the theoretical ratio of cross-sectional area of the individual fibers making up the bundle to that of the actual bundle is 39.7%.

A mold is prepared having a ram-up core 5 for forming an annular shaped body 11 of a small diameter and a ram-up core 6 for forming a semi-annular shaped body 12 of larger diameter. The mold 2 includes cavities 3 and 4 together with a longitudinal cavity section 9 for forming the rod portion of a connecting rod. The cavity 3 forms the small end portion 11 and the cavity 4 forms the large end portion 12 of the connecting rod. The uni-directional bundle of inorganic fibers prepared above is laid within previously prepared concave portions 7,8 of the ram-up cores 5, 6 as a bridge extending down the longitudinal cavities of section 9. The major axis of the elliptical cross-section of the bundle is placed parallel to the Y-axis thus making the second moment of area about the Y-axis (I(c) y) smaller than the second moment of area about the X-axis (I(c) x).

A fixed minimum gap is present between the unit directional bundle of fibers F and the wall of the longitudinal cavity section 9. The gap is from 1.5 to 2.0 mm. Using an aluminum alloy (AC 4 D in accordance with Japanese Industrial Standards) as the matrix metal M, the alloy is filled into the uni-directional bundle of inorganic fibers and squeeze cast to produce the connecting rods. The connecting rod is further machined. The end portions of the uni-directional fiber bundle extending into the finished annular shaped body of small diameter 11 and the semi-annular shaped body of large diameter 12 are appropriately trimmed. The resulting minimum cross-sectional area A of the rod shaped portion of the connecting rod is 209 mm². The volume fraction $\overline{V}_f$ of this bundle in the cross-sectional area was 16.4 percent. The second moment of area about the Y-axis of the core of this connecting rod is 1700 mm⁴ and the second moment of area about the X-axis of the core is 7630 mm⁴. Despite the reorientation of the core, the rod is found to have sufficient buckling strength for long, useful service in an engine.

COMPARATIVE EXAMPLE I

Figure 5:
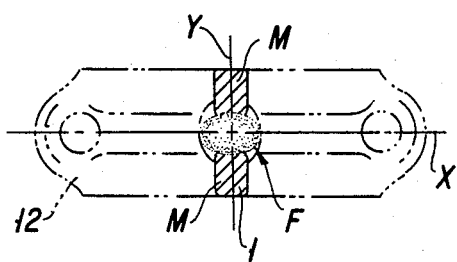
FIG. 5 is a cross-sectional view of comparative example I taken along lines IV—IV of FIG. 3.

The connecting rod of this Comparative Example 1 was prepared in an identical manner to that of Example 1 of the present invention except that the uni-directional bundle of inorganic fibers was formed having an elliptical cross-section with the major axis oriented along the X-axis and the minor axis oriented along the Y-axis precisely as shown in FIG. 5.

COMPARATIVE EXAMPLE II

Figure 6:
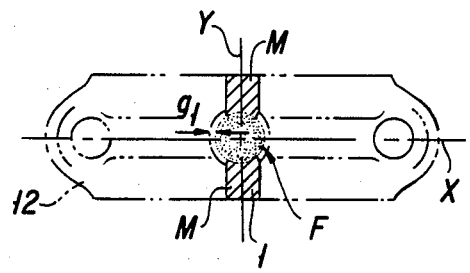
FIG. 6 is a cross-sectional view of comparative example II also taken along line IV—IV of FIG. 3.

A connecting rod of this Comparative Example II was prepared identically to the connecting rod of the Example I of the present invention except that the uni-directional bundle of inorganic fibers had a circular cross-section precisely as shown in FIG. 6. The circular cross-section had a diameter of 10.5 mm. The bulk density and cross-sectional area ratio are the same as Example 1; that is, 3.1 grams per cc and 39.7 percent. The gap between the bundle of fibers and the sidewalls of the cavity 9 of the mold was from 1.0 to 1.5 mm.

The following results were obtained after evaluating the tendency for cold shuts and the filling performance of the metal into the bundle to form the matrix after squeeze casting:

TABLE 1

| | shape of cross-section of the uni-directional bundle of inorganic fiber | tendency to form a cold shut | filling performance of metal into bundle |
|---|---|---|---|
| Present Invention | I (c) y < I (c) x | none | good |
| Comparative Example I | I (c) y > I (c) x | very high | good |
| Comparative Example II | I (c) y = I (c) x | very high | poor |

Figure 4:
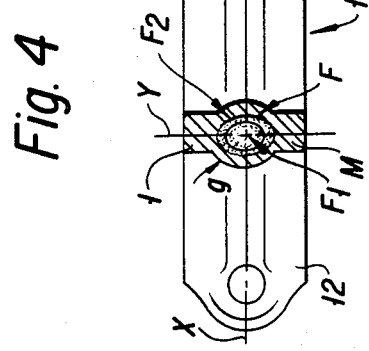
FIG. 4 is a cross-sectional view taken along lines IV—IV of FIG. 3.

As can be readily understood from the comparison of the above Table and FIGS. 4, 5 and 6, when a sufficient gap g is formed between the uni-directional bundle of inorganic fibers and the sidewall of the cavity of the mold, the performance of casting is simplified.

Therefore, the tendency for cold shuts is reduced.

In Comparative Example II, the diameter of the uni-directional bundle of inorganic fibers would have to be reduced to less than 9.5 mm to form the same fixed minimum gap as is formed with the present invention between the uni-directional bundle of inorganic fibers and the sidewalls of the cavity for forming the rod portion. Additionally, in Comparative Example II, in order to maintain the same volume fraction percentage of fiber bundle to total rod cross section, the bulk density of the fiber would have to be increased to 3.8 grams/cc. The cross-sectional area ratio would then become 48.5 percent which results in a 23 percent increase when compared with Example 1 of the present invention. Thus, the filling performance of the matrix would decrease.

Consequently, the particular orientation and shaping of the bundle of the uni-directional fibers in accordance with the present invention permits a sufficient gap to be retained between the bundle and the wall of the mold which ensures that the molten metal flows smoothly, that the tendency for forming a cold shut is decreased, and that the filling performance of the matrix is good, while, in actual practice, retaining sufficient strength.

Example II

A bundle F 1 of uni-directional fibers made of 306,000 alumina fibers each having a diameter of 10 microns was surrounded by 91,000 stainless steel fibers F 2 having a diameter of 12 microns (SUS 32 in accordance with Japanese Industrial Standards). The surrounded bundle F 1, F 2 was inserted into a heat resistant tube P having an ellipse shape in cross section. The heat-resistant tube was then heated at 700° C. for 10 minutes whereby the stainless steel fibers F 2 were at least partially fused and combined with one another and the alumina fibers which they surrounded. The resulting bundle F of uni-directional fibers had an ellipse shape with a major axis diameter of 12 mm and a minor axis diameter of 9.2 mm. The weight of the bundle was 19.1 grams and the bundle had an overall length of 136 mm. The bundle was placed into a mold and cast in an identical manner to that of Example 1. The smallest minimum area A in cross section of the rod portion of the connecting rod so formed was 209 mm² and the volume fraction $\overline{V}_f$ in this smallest cross section of the bundle of fibers F was 16.4 percent. The volume fraction of alumina fibers was 11.5 percent and the volume fraction of stainless steel fibers was 4.9 percent. The ratio of volume fraction of alumina fibers to volume fraction of stainless steel fibers was 7:3.

The second moment of area of the core with respect to the Y-axis (I(c) y) was 1700 mm⁴ and the second moment of area of the core with respect to the X-axis (I(c) x) was 7,630 mm⁴. The rate of stress reduction at the smallest cross-sectional area portion of the rod portion of the connecting rod was 34.2 percent.

In Example 1, the bundle of unit directional fibers made only of stainless steel having an identical size, had a weight of 36.5 grams and a rate of stress reduction at the smallest sectional area portion of the rod portion of the connecting rod was 20.7 percent.

Thus, it can be readily seen that a two-component unit directional fiber bundle is lighter in weight than a bundle made only of metallic fiber and permits a rate of stress reduction which is improved over that of a bundle made only of metallic fiber.

It is not absolutely necessary for these improvements that the metallic fibers surround a core of only non-metallic fibers. That is, the metallic fibers may be mixed uniformly into the bundle of non-metallic inorganic fibers or non-metallic inorganic fibers having a metal coating may be mixed uniformly into the bundle of non-metallic fibers.

Consequently, it is readily apparent that all of the above-mentioned objects and others which will become readily apparent to a person of ordinary skill in the art have been attained in the present invention. It should be understood that the specific forms of the invention described herein-above are intended to be representative only, as certain modifications within the scope of these teachings will be apparent to those skilled in the art.

Accordingly, reference should be made to the following claims in determining the full scope of the invention:

What is claimed is:

1. Method of making a connecting rod for an internal combustion engine, said rod having a first semi-annular end portion, a second annular end portion, and a rod portion therebetween, said second annular portion having a center axis, said rod portion having a longitudinal axis, an X-axis perpendicular to said longitudinal axis and perpendicular to said center center axis, and a Y-axis perpendicular to said longitudinal axis and parallel to said center axis, said method comprising the steps of:

shaping a bundle of inorganic reinforcing uni-directional fibers
such that a second moment of area of the bundle about the Y-axis (I(c) y) taken across a cross-section perpendicular to the longitudinal axis is less than a second moment of area of the bundle about the X-axis (I(c) x),
positioning said bundle in a mold, said mold having cavities to form said semi-annular portion, said annular portion and said rod portion, the cavity to form the rod portion being sized such that the second moment of area of the finished rod about the X-axis (Ix) is greater than the second moment of area of the finished rod about the Y-axis (Iy), said bundle being positioned to bridge from said cavity for said semi-annular portion and to produce a fixed minimum gap between said bundle and the cavity for said rod portion; and
squeeze casting a molten light metal alloy into said mold forming a matrix of said alloy and said bundle.

2. The method of claim 1, wherein the step of shaping includes,
forming a bundle of a plurality of uni-directional metallic fibers,
placing said bundle in a heat-resistant shaping container, and
heating said contained bundle to at least partially fuse said uni-directional metallic fibers to each other.

3. The method of claim 1, wherein the step of shaping said bundle includes:
forming a core bundle of a plurality of uni-directional inorganic non-metallic fibers,
surrounding said core bundle with a plurality of uni-directional metallic fibers oriented in the same direction as said core bundle,
placing said surrounding core bundle in a heat-resistant shaping container, and
heating said container surrounded core bundle to at least partially fuse said uni-directional metallic fibers to each other and to said core.

4. The method of claim 1, wherein the step of forming said bundle includes:
forming a core bundle of plurality of uni-directional non-metallic fibers,
surrounding said core bundle with a second plurality of uni-directional non-metallic fibers,
said second plurality having a metal coating and being oriented in the same direction as said core bundle,
placing said surrounded core bundle in a heat-resistant shaping container, and
heating said contained surrounded core bundle to at least partially fuse said uni-directional metal-coated metallic fibers to each other and to said core.

5. The method of claim 1, wherein the step of shaping said bundle includes:
forming a bundle of a uni-directional uniform mixture of metallic fibers and inorganic, non-metallic fibers,
placing the mixed bundle in a heat-resistant shaping container, and
heating said contained bundle to at least partially fuse said metallic fibers to each other and to said inorganic non-metallic fibers.

6. The method of claim 1, wherein the step of shaping said bundle includes:
forming a bundle of an uni-directional uniform mixture of inorganic non-metallic fibers having a metal coating and inorganic, non-metallic fibers,
placing the mixed bundle in a heat-resistant shaping container, and
heating said contained bundle to at least partially fuse said inorganic non-metallic fibers having a metal coating to each other and to said inorganic, non-metallic fibers.

7. The method of any one of claims 1, 2, 3, 4, 5 or 6 wherein said fixed minimum gap is from about 1.5 to about 2.0 mm.

8. The method of any one of claims 2, 3, 4, 5, or 6 wherein said heating step is at a temperature of 700° C.

9. The method of any one of claims 1, 2, 3, 4, 5, or 6, wherein said bundle is shaped as an ellipse in cross-section having a major axis on said Y-axis and a minor axis on said X-axis.

* * * * *

UNITED STATES PATENT AND TRADEMARK OFFICE
CERTIFICATE OF CORRECTION

PATENT NO. : 4,534,400
DATED : August 13, 1985
INVENTOR(S) : KEISUKE BAN ET AL

It is certified that error appears in the above-identified patent and that said Letters Patent is hereby corrected as shown below:

On the cover page, Item [30], after "56-145990" insert ---
Sept. 16, 1981 [JP]  Japan................ 56-145989 ---.

Signed and Sealed this

Third Day of June 1986

[SEAL]

Attest:

DONALD J. QUIGG

Attesting Officer

Commissioner of Patents and Trademarks